UNITED STATES PATENT OFFICE.

GUSTAVE SOBOTKA, OF NEW YORK, N. Y., AND ADOLPH KLIEMETSCHEK, OF BALTIMORE, MARYLAND.

METHOD OF MANUFACTURING YEAST FROM MOLASSES.

SPECIFICATION forming part of Letters Patent No. 578,367, dated March 9, 1897.

Application filed January 26, 1895. Serial No. 536,377. (No specimens.)

*To all whom it may concern:*

Be it known that we, GUSTAVE SOBOTKA, residing at New York, in the county of New York and State of New York, and ADOLPH KLIEMETSCHEK, residing at Baltimore, in the State of Maryland, citizens of Austria-Hungary, have invented certain new and useful Improvements in Methods of Manufacturing Yeast from Molasses; and we do hereby declare the following to be a full, clear, and exact description of the invention, such as will enable others skilled in the art to which it appertains to make and use the same.

This invention relates to methods of manufacturing yeast; and the main objects are to provide a method whereby a desirable quality of yeast may be produced from molasses, particularly the cheaper and more common grades known and referred to as the "molasses of the trade," and to utilize in the production of a yeast medium the nitrogenous substances obtained from the residuum or refuse of starch, dextrine, and oil factories, breweries and distilleries, and animal matter ordinarily cast off as waste in tanneries, &c.

It is well known that the molasses of the trade contains besides sugar a variety of ingredients which tend to retard fermentation and to impart to the products of fermentation (that is, yeast and alcohol) an offensive odor which depreciates the value of the product and renders it of an inferior or second quality. To overcome these difficulties and at the same time to produce a yeast medium at a very small cost, we treat common molasses with chemical agents or substances which will partially decompose the deleterious ingredients and eliminate the principle or properties which tend to retard fermentation and impart an offensive odor, and then mix with nitrogeneous substances preparatory to treating with yeast. To this end we place the molasses to be treated in a vat, in which may be arranged a steam-coil for heating a quantity of molasses. The molasses, if necessary, is first acidulated by treating with any kind of acid, but preferably sulfuric acid, so as to produce a slight acidity, and is then treated with oxidizing agents, such as potassium manganate or permanganate or other chemical compounds. Acidulation, however, is not necessary when the molasses is already sour. We then raise the temperature of the molasses to about seventy (70) degrees centigrade and regulate the temperature of the room in which the vessel or vat is placed in such manner that the temperature of the molasses may fall back to from thirty-five (35) degrees to forty (40) degrees centigrade in a certain time, the time allowed for this purpose being shorter or longer, according to the impurities of the molasses, usually about eighteen (18) hours. The molasses is then diluted with water (about half and half) and drawn off into a closed vat or air-tight receptacle containing a steam heating-coil and which is in communication with an air-pump through a suitable valve. The liquid is now treated with sulfurous acid (or other agents which attack the deleterious ingredients, decomposing the same and reducing the odoriferous and coloring qualities) and allowed to stand for a sufficient time to permit the decomposition to take place, which usually requires about three hours, (the time being dependent upon the quality of the molasses used and the quantity being treated.) If peptonized nitrogenous matters are used, that is, albuminous matter which is rendered soluble by peptonizing in the ordinary manner or according to methods in common use, as hereinafter described, they may now be mixed with the resultant liquid or added at a subsequent stage, as will hereinafter appear. The temperature of the liquid is now gradually raised to the boiling-point, which may be accomplished by the use of steam or in any proper manner. By this means the sulfurous acid is vaporized and caused to pass off, or it may be conducted into a condenser. After boiling, the air-valve is opened to permit the introduction of air, which may be forced into the liquid by means of an ordinary force-pump or any other suitable contrivance, the air being used to effect the vaporization of the residuum of the sulfurous acid. The liquid thus purified and bleached is next mixed with nitrogenous substances obtained from the residuum of starch-factories, dextrine-factories, glucose-factories, oil-factories, breweries, distilleries, and animal matter ordinarily cast off as waste in tanneries, &c. To render the nitrogenous substances soluble, the residuums or animal matter may be either peptonized or treated chemically in suitable vessels at an ordinary atmospheric temperature or at a higher temperature and under steam-pressure, if desired. The liquid is next cooled to about thirty (30) degrees centigrade and is then treated with yeast to produce fermentation.

Different quantities of oxidizing material will be required in treating different kinds of molasses, the amount in any particular case being dependent upon the character of the molasses and of the waste material used. In using ordinary New Orleans molasses, for instance, about one-quarter pound of permanganate will be required for every one hundred pounds of molasses. The quantity of permanganate to be used in treating a given quantity of molasses of whatever character may be ascertained by preparing a solution of permanganate and pouring it gently or drop by drop into a small portion of the molasses diluted with water. So long as there is matter to be oxidized chemical action will take place, and the permanganate will change color, but when there is nothing left to oxidize chemical action will cease, and thereupon the permanganate will no longer change color, thereby making it apparent to the observer that a sufficient quantity of permanganate has been added to the molasses to produce the desired effect. Thus the amount of permanganate required for treating a larger quantity of molasses may be readily ascertained, the quantity of permanganate used in treating a larger quantity of molasses being in the same proportion to the molasses to be treated as the smaller quantity of permanganate used in making the test is to the smaller quantity of molasses used for testing.

Having thus fully described our invention, what we claim as new, and desire to secure by Letters Patent of the United States, is—

1. In the art of manufacturing yeast from molasses, substantially as described, the improved step in the process, which consists in purifying and bleaching the molasses by treating the same with oxidizing and reducing agents preparatory to mixing the resultant liquid with nitrogenous substances, substantially as set forth.

2. In the art of manufacturing yeast from molasses, the method of purifying and bleaching the molasses, which consists in treating the same with oxidizing agents, then raising the temperature to nearly the boiling-point, then reducing the temperature to about blood heat, then diluting with water, and then treating the liquid with sulfurous acid or equivalent reducing agent, substantially as described.

3. The process of producing a yeast medium from molasses, which consists essentially in first treating the molasses with an oxidizing agent, then raising the temperature of the molasses to nearly the boiling-point, then gradually reducing the temperature to a moderate or blood heat, then diluting the molasses with water, then treating the liquid with sulfurous acid or equivalent reducing agent, then gradually raising the temperature of the liquid to the boiling-point so as to drive off or vaporize the sulfurous acid, and finally mixing the liquid thus produced with nitrogenous substances, substantially as described.

4. As an improvement in the art of manufacturing yeast, the method of utilizing molasses and the waste material from starch and other factories in the production of an alcoholic liquor adapted for use as a yeast medium, which consists in first raising the temperature of the molasses to nearly the boiling-point and then gradually lowering the temperature to a moderate or blood heat, then diluting with water, next treating the resulting liquid with sulfurous acid and allowing it to stand for a sufficient time to permit decomposition, then gradually raising the temperature of the liquid to about the boiling-point and forcing air into the liquid to vaporize the sulfurous acid, and finally treating the liquid thus purified and bleached with soluble nitrogenous substances obtained from the residuum of starch and other factories, substantially as described.

5. The method of manufacturing yeast from molasses, which consists in raising the temperature of the molasses to nearly the boiling-point and gradually lowering the temperature to about a blood heat, then diluting with water, next treating the resulting liquid with sulfurous acid and allowing it to stand for a sufficient time to permit decomposition, then gradually raising the temperature of the liquid to about the boiling-point, then forcing air into the liquid to vaporize the sulfurous acid, then treating the liquid thus purified and bleached with nitrogenous substances, then cooling to about 30° centigrade and finally treating with yeast to produce fermentation, substantially as described.

6. The process of producing a yeast medium from molasses which consists in treating the molasses with oxidizing and reducing agents and then mixing the liquid thus treated with nitrogenous substances preparatory to treating with yeast, substantially as described.

7. The process of producing a yeast medium from molasses, which consists essentially in first treating the molasses with oxidizing agents, then raising the temperature of the molasses to nearly the boiling-point, then gradually reducing the temperature to a moderate or blood heat, then diluting the molasses with water, then treating the resultant liquid with sulfurous acid or equivalent reducing agent, then gradually raising the temperature of the liquid to the boiling-point, and introducing air into the liquid so as to drive off and eliminate the sulfurous acid, and finally mixing the liquid thus produced with nitrogenous substances, substantially as described.

8. The improvement in the art of manufacturing yeast from molasses, which consists in treating the molasses with oxidizing agents, then raising the temperature of the molasses to nearly the boiling-point, then reducing the temperature to approximately a blood heat, then diluting with water, then treating with reducing agents, then raising the temperature to the boiling-point and introducing air so as to expel the sulfurous acid, then treating the liquid with nitrogenous substances, and finally adding yeast to produce fermentation, substantially as described.

In testimony whereof we affix our signatures in presence of two witnesses.

GUSTAVE SOBOTKA.
   ADOLPH KLIEMETSCHEK.

Witnesses:
 JOHN McQUADE,
 JAS. A. DONALDSON.